Fig. 2.

Nov. 3, 1931.  R. CHILTON  1,830,349
TRANSMISSION
Filed April 26, 1926  6 Sheets-Sheet 3

INVENTOR
ROLAND CHILTON

ATTORNEY

Fig.6.

Nov. 3, 1931.                R. CHILTON                1,830,349
                             TRANSMISSION
                         Filed April 26, 1926    6 Sheets-Sheet 5

INVENTOR
ROLAND CHILTON
BY
ATTORNEY

Nov. 3, 1931.   R. CHILTON   1,830,349
TRANSMISSION
Filed April 26, 1926   6 Sheets-Sheet 6

INVENTOR
ROLAND CHILTON

Patented Nov. 3, 1931

1,830,349

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

TRANSMISSION

Application filed April 26, 1926. Serial No. 104,644.

This invention relates to power transmission mechanism in general, and in a specific aspect to means for driving a rotatable member having varying speed, from a driving shaft, and for controlling the speed and torque relationships therebetween. The invention is intended to be of general application for these purposes, while the form shown is adapted to impose a predetermined driving effort on a means to be started from rest and finally driven at a pre-determined speed ratio from a relatively high speed driving shaft.

Such a transmission means is required, for example, to utilize in an engine starter the great energy that may be obtained from a light flywheel rotated to high speed, as is done in my Patent No. 1,561,506 by a slipping clutch, that yieldably drives the engine while it is being brought up to starting speed through a high reduction gear train.

With the pre-set clutch of that invention, slippage occurs whenever the engine is rotating at less speed relative to the flywheel than that due to the gear ratio, as during the acceleration period following connection with the speeding flywheel. During such slipping, at least as much energy as is usefully applied to the engine, is wasted in the clutch and the power thus wasted increases with the inertia of the engine flywheel means.

To avoid this loss of power characteristic of frictional yielding devices, rotationally yielding spring drive connections have been suggested, but in practice such torsional yielding spring means need be of enormous proportions to safely absorb the energy involved. For instance, the flywheel in a widely used size of starter built under my previously mentioned patent, stores several thousand ft.-lbs. of energy to absorb which, a practicable rotary (steel) spring alone would have several times the weight of the entire present machine, while the rotational range of such a spring is limited. A spring connection, however, would have the great advantage that the energy it absorbs may be usefully recovered and accordingly one of the principal objects of the present invention is to provide a means whereby a relatively light and small spring means may be used to limit the load on the mechanism through an indefinitely great number of turns of the driving member, and whereby the energy put into the spring when yielding is usefully recovered, and whereby the desired driving effort is impressed on the means to be driven both while it is being brought up to speed and thereafter, and even though said means be at rest, as at the instant of connection with the speeding flywheel.

Another important object of the present invention is to provide a simple, compact, light and efficient transmission mechanism that will combine the function of both a gear train and a load limiting device such as shown in my previous invention, for example.

Relatively great speed reduction is desirable in apparatus of the class here illustrated, and another object of the present invention, is to provide a mechanism wherein any desired ratio may be obtained without increase in the size or the number of parts, and wherein the drive ratio will automatically approach the zero condition as the resistance of the driven means approaches a preset maximum and whereby the driving member may continue rotation indefinitely without loss of power even though the driven means offers a resistance to turning beyond the capacity of the mechanism.

Broadly, I achieve these objects by providing a drive shaft with cranks or eccentrics adapted to oscillate arms or levers having a one-way connection with a driven member, and by incorporating a yielding means in each oscillating connection.

For the purposes of this disclosure, the invention is embodied in a flywheel type engine starter as illustrating a case where a driving means is needed which shall be capable of exerting a controlled driving force from a high speed shaft upon a driven shaft subject to varying rotational speeds.

With reference to Figs. 1 to 5, 12 designates a drive shaft, preferably supported on anti-friction bearings, and provided with, (in this particular instance two), cranks or eccentrics 13 and 14. Connecting rods comprising springs 15, 16 having ring-like end portions 17 at their upper ends engage the eccentrics 13, 14 through anti-friction bearings 18. Each one of these spring connecting rods 15, 16 is attached at its lower end to an end of the one-way drive levers 19, 20, adapted for oscillation about the axis of the drums 22, which are driven thereby.

On the driven drums 22 there are formed one or more annular grooves 27 (one groove being shown in Figs. 1 to 5) which provide concentric tracks or driving faces 28, adapted to be frictionally engaged by arcuate projections 29, 30 formed on opposite sides of the levers 19, 20. These projections are fitted to the faces 28 and have alternatively extended and shortened contact surfaces so disposed that when the tendency of rotation of the levers 19, 20 is clockwise relative to the drums the driving portions of these surfaces, (indicated by the multiple arrows shown in the drawings) will be forced into contact with the driving faces of the drums with sufficiently great pressure to overcome sliding tendency, while the surfaces 31 on the opposite or non-driving ends of the lever projections are so extended circularly as to insure free sliding under reverse oscillation.

To avoid sliding, the pressures normal to the driving faces, (see diagram of Fig. 4) must exceed the turning effort tangential to these faces in greater ratio than that coefficient of friction of the surfaces, and this will be realized when the ratio of the offset between the driving faces to the effective length of the lever is greater than the friction coefficient; and sliding will occur when the separation ratio is less than the friction coefficient.

The forward and backward lever-end contact surfaces are so proportioned that these ratios are respectively considerably greater and considerably less than the friction coefficient of the surfaces. Thus a one-way connection between the levers and the drum is provided, whereby the levers may freely oscillate backward relatively to the drum while each lever will in turn take up the drive to the drum as it reaches the drum speed in each forward oscillation.

The springs 15, 16 are so proportioned as to deflect an amount equal to the full stroke of the eccentrics when the driving capacity of the mechanism is reached. It should be particularly noted these springs will be deflected, under overload conditions, during each forward stroke of the eccentrics 13, 14, and will recover during the succeeding return stroke, so that the energy taken from the driving shaft during compression of the springs will be balanced by the energy returned during the subsequent recovery of the springs. Thus a regenerative, oscillating yielding connection is provided, whereby a continuous and predetermined driving effort may be maintained on a driven member without loss of power when the member is slowed down or stopped by an excessive resistance. This constitutes one of the principal features of this invention.

Figures 1, 5:
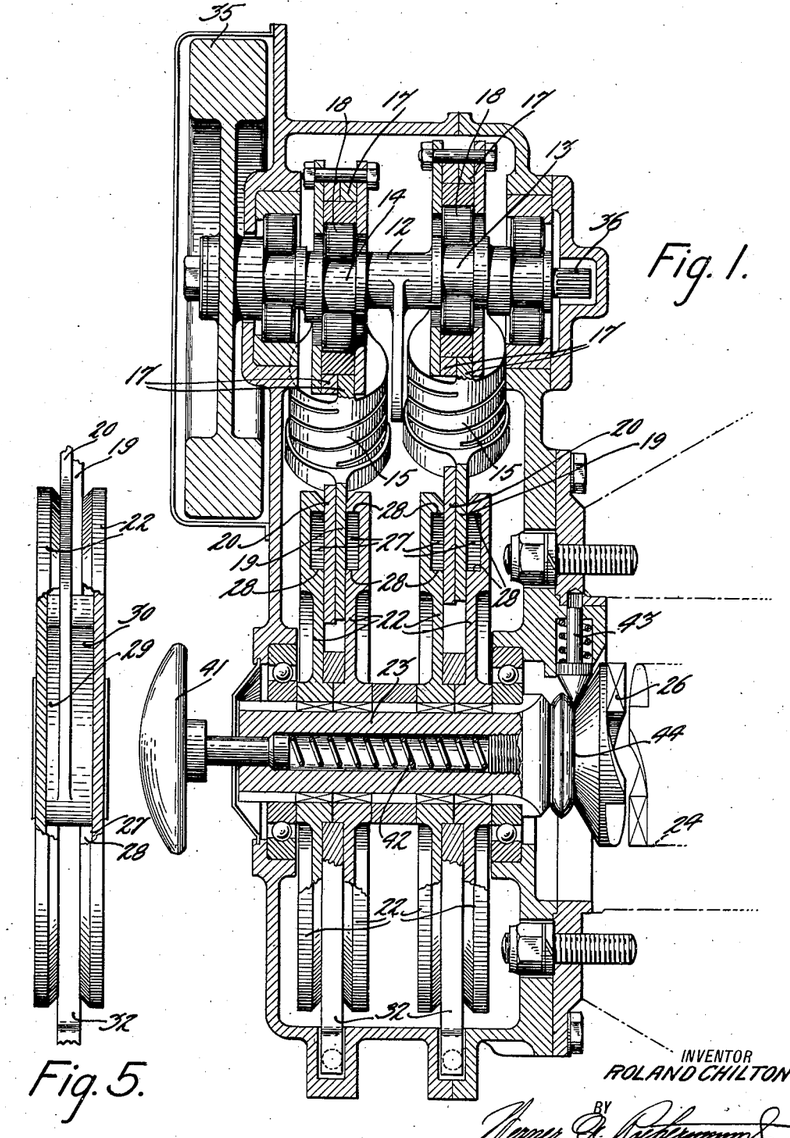
Figure 1 is a vertical section illustrating an embodiment of the present invention as attached to an internal combustion engine for the starting thereof.
Figure 5 is a detail view partly in section of a pair of driven drums and a portion of the actuating arms.
Figure 2:
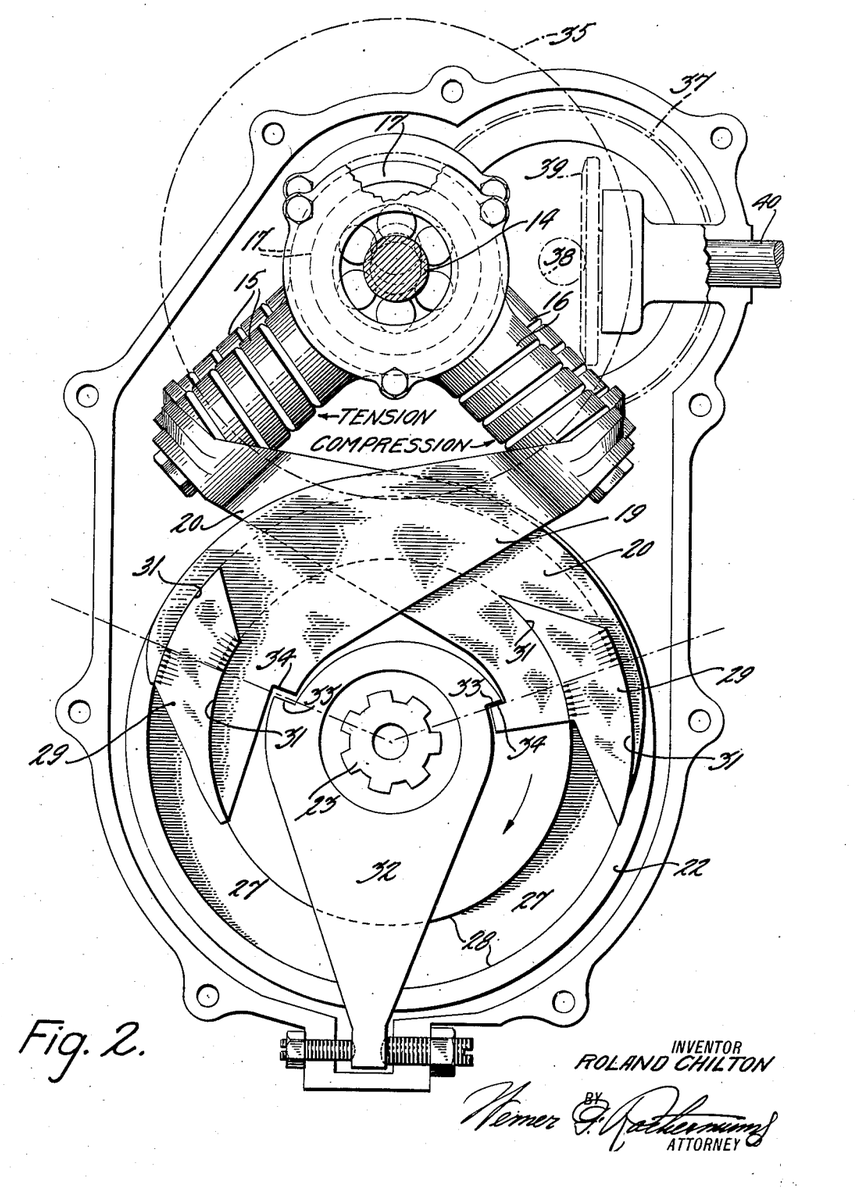
Figure 2 is an end elevation of the parts shown in Fig. 1 as they would appear with the cover removed.
Figures 3, 4:
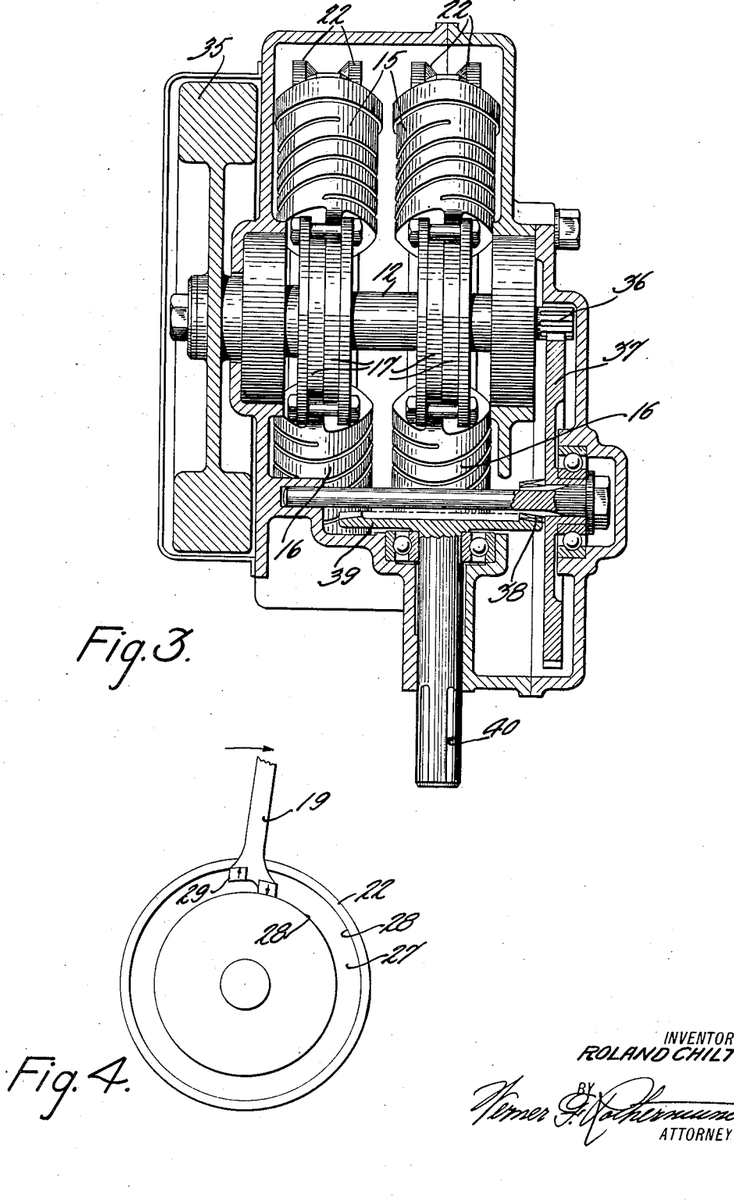
Figure 3 is a plan view partly in section.
Figure 4 is a diagrammatic view illustrating the driving forces in the one-way driving connection.
Figure 6:
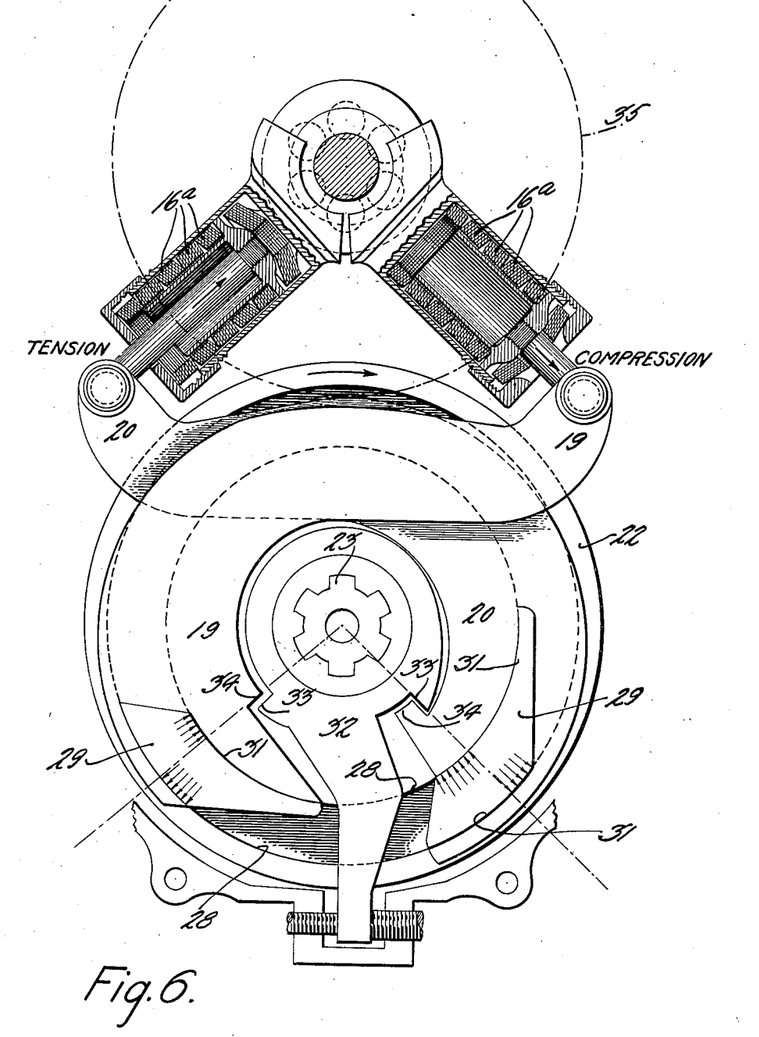
Figure 6 is an end elevation similar to Fig. 2 illustrating an alternative spring structure.
Figure 7:
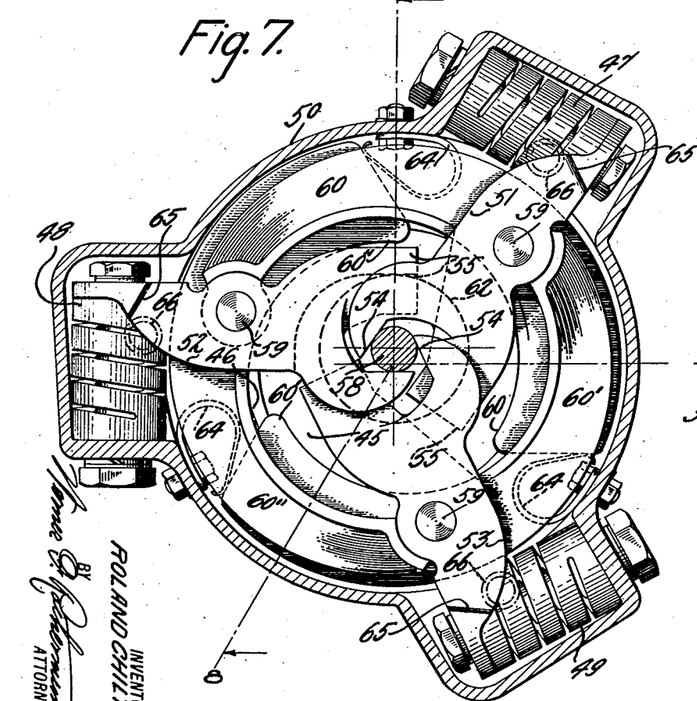
Figure 7 is a cross section of the preferred form of the invention.
Figure 8:
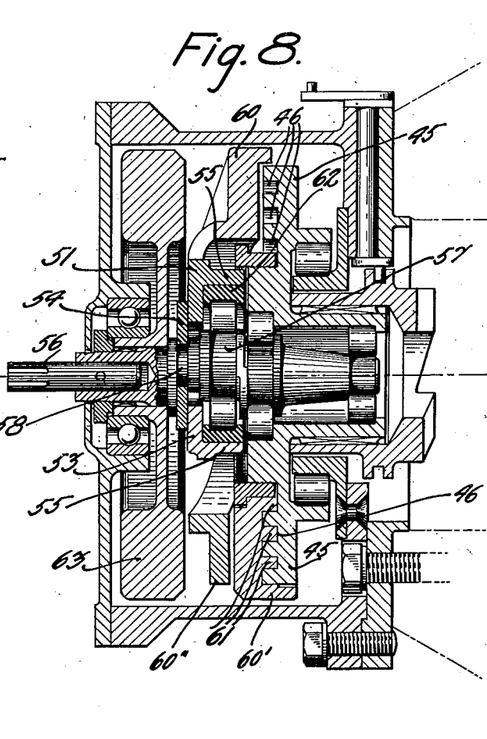
Figure 8 is a vertical section of the preferred form taken substantially on the line 8—8 of Fig. 7.
Figure 9:
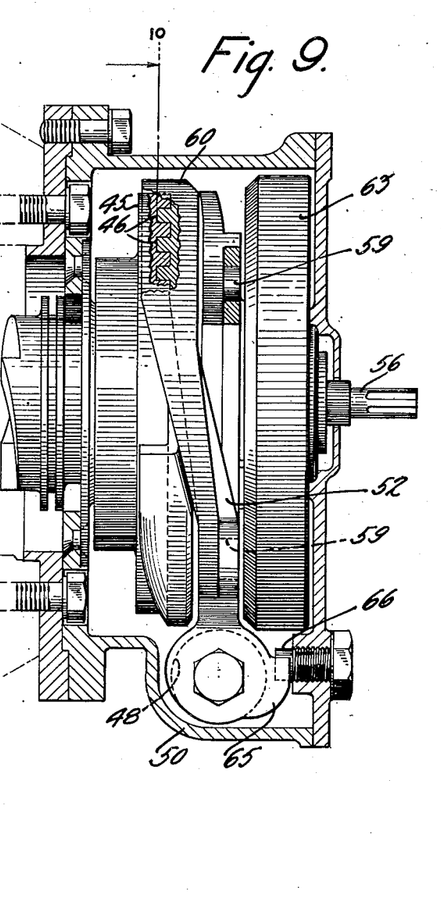
Figure 9 is a partly sectional view as looking from the side opposite to Fig. 8.
Figure 10:
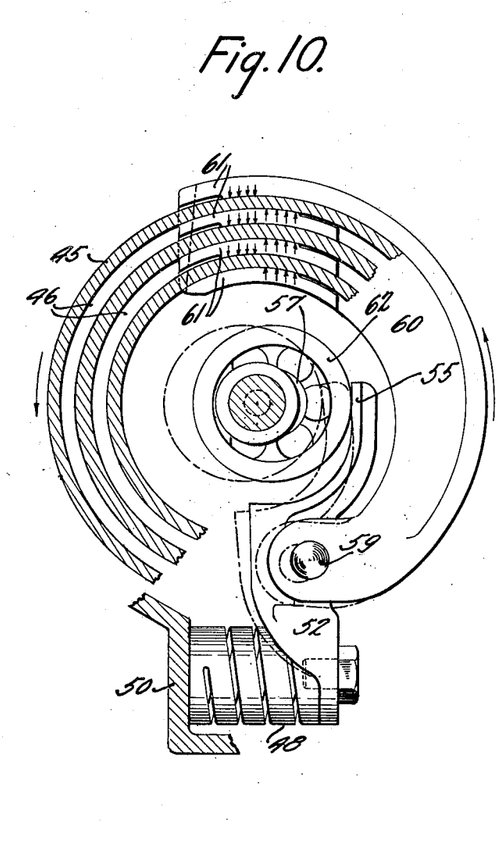
Figure 10 is a fragmentary detail view of one of the actuating arms and levers showing a portion of the drum in section said section being taken on the line 10 of Fig. 9.

With springs of the type illustrated at 15, 16 the deflection is proportional to the load, and the proportion of the stroke of the eccentrics absorbed by such springs, and hence the driving ratio of the device, will vary with the driving resistance encountered and will approach zero as the deflections of the springs approaches the throw of the eccentrics. This is desirable for certain applications while in others it is desirable to utilize the full stroke, i. e., the maximum driving speed, at all loads up to a preset amount, whereat it is desired to have the springs yield completely without greatly increasing the load. For this purpose, with reference to Fig. 6, a spring set under initial tension may be used and a preferred form of spring 16ª comprises a series of nested, dished spring rings. Such springs may be proportioned to have much greater stiffness at the beginning of compression than after this initial reluctance has been overcome and by the use of springs having such characteristics, or assembled under initial load, the driving mechanism of this invention may be made to maintain the full effective stroke, and therefore driving ratio, up to any desired load.

In the particular cases where an overload may arise from an actually reversed rotation of the driven means through a greater angle than that due to one stroke of the eccentric, the yielding of the springs would be ineffective to protect the mechanism and to meet this special cause which would occur in the event of a back fire of an engine to be started, a safety device comprising an adjustably fixed arm 32, having abutments 33, is provided. The driving levers 19, 20 are provided with engaging abutments 34, which do not contact during normal oscillation of the levers, but only upon abnormal backward oscillation. Such contact will reverse the direction of the pressures at the engaging surfaces and relieve the self locking pressures and so permit the drum to slip relative to the levers.

In the specific crank disposition of the "figures" just described, the driving levers 19, 20 engage each crank throw by spring connecting rods 15, 16, disposed at 90° and to obtain the proper spacing of the driving action of each lever the parts which engage the same drum tracks are crossed, whereby one of the connecting rods 16 drives by compression and the other rod 15, by tension.

In this specific starter embodiment, a flywheel 35, adapted for the storage of energy is shown, and where a low speed energizing means is employed. a light gear train comprising gears 36, 37, 38 and 39 connects to the low speed power shaft 40, and the driven shaft 23 is provided with an engine engaging jaw clutch 26 and drivably splined to the drums 22 for axial engaging movement with the jaw, the drum and shaft assembly being supported on suitable bearings which prevent axial motion of the drums. Axial engaging movement of the driven shaft 23 may be accomplished by pressure upon the knob or handle 41, until the spring 42 has been sufficiently compressed to overcome the restraint of the spring pressed detent 43 engaged in a groove 44.

In operation, the shaft 12 may be driven by any means such as an electric motor, or by the flywheel 35 which has been previously energized. The rotation of the shaft 12 will cause the springs or connecting rods 15, 16 to oscillate the drive levers 19, 20 with and within the annular grooves 27 of the drums 22 and cause them to frictionally engage the same for one-way driving in the manner hereinbefore described.

The light pre-energizing gears 36, 37, 38, 39 have no part in drivably connecting the driving and driven shafts and will not generally be in use when the transmission means of this invention is functioning.

In Figs. 7, 8, 9 and 10, there is shown a preferred embodiment of the invention featuring compactness from a concentric disposition having a common driving eccentric for all the oscillating means. These comprise radial levers 51, 52, 53 having driving extensions 55 which engage the outer race 62 of an antifriction bearing on the eccentric 57, formed on the drive shaft 56. Separation of the driving surfaces is prevented by further extensions 54 which have opposed engagement with a side extension 58 of the eccentric.

The levers 51, 52, 53 are fulcrumed to the casing 50 by springs 47, 48, and 49 and to each one of the levers there are pivoted respectively at 59 the driving or drum-actuating arms 60, 60' and 60" which are each provided with a plurality of arcuate projections 61 adapted for retractive sliding in the grooves 46 of the drum 45, and to frictionally engage the driving faces formed by these grooves so as to drive the drum when moving in a clockwise direction.

When the drive shaft 56 is set into operation as from a motor or the previously energized flywheel 63, the eccentric 57 will oscillate the levers 51, 52, 53 at least one of which is always moving in the driving direction. As will be better understood from Fig. 10 this oscillatory motion of the levers is in turn transmitted to the actuating arms 60, 60' and 60" by the pivots 59, said motion tending initially to force the actuating arms out of their normal concentric relation with the drum, thus causing the engaging surfaces as indicated by the multiple arrows to frictionally engage the drum and impart thereto a rotary driving motion in the direction indicated by the arrows. The full lines in Fig. 10 indicate the extreme moved position of the arms in a driving direction, whilst the broken lines indicate the full retracted position. Engagement springs 64, (Fig. 7) are secured to the casing 50 and have their free ends bearing on the actuating arms 60, 60', 60" so as to initiate the gripping of these arms on the drum.

Inclined faces 65 on the actuating levers 51, 52, 53, are arranged to contact with fixed abutments 66 should the springs be compressed more than sufficiently to absorb the throw of the eccentric as could happen upon a violent reversal of the driven means. Such contact will change the direction of pressure between the driving faces and the drum grooves and so permit slippage thereat.

For durability under the high speeds and loads contemplated in this invention, the one-way driving connections should be instantaneously self-locking without creep between the surfaces as from working deflections of the parts, and should also be completely self-releasing. The forms of one-way drive mechanism shown are featured as providing these characteristics. The multiple grooves of the preferred showing afford increased contact area, reduce the overhang and deflections of the lever and drum projections and also reduce the contact loads and so increase the driving capacity of light parts adapted for high frequency oscillation.

It should be noted that the throw of the driving eccentrics of this invention may be much smaller than practicable for the pitch diameter of a driving pinion of a gear train of equivalent capacity, and hence the maximum velocity of the parts will be less than would be the pitch velocities of a comparable pinion. Also the driving elements come under load only once per revolution of the driving member instead of several times as with a pinion of several teeth.

It will be seen that this invention provides a crank and spring-connection rod mechanism wherein even under the extreme conditions where the drive member is locked against rotation and the spring accordingly absorbs the entire throw of the crank, the energy put into the spring from its driving crank during each half revolution which compresses the spring, is returned to the crank during the succeeding half revolution during which the spring recovers and so drives the crank. Thus, the energy stored by the spring is only that due a half turn of the crank, although an indefinite number of turns may be needed to absorb the entire energy of the driving means, as would have to be done by the rotationally yielding spring means previously referred to.

Any movement of the driven means during one cycle takes a corresponding amount of energy from the spring, which accordingly returns that amount less to the crank, while under normal load conditions when the spring is not moved from its preset condition but acts as a rigid connection, all the energy of each stroke is impressed directly upon the driven member without temporary absorption into the spring.

It will be seen that in one turn of the driving crank shaft, the movement of the drum measured at the radius of the ends of the levers, will be equal to the crank stroke (less the aggregate deflection of the springs and the parts) thus any desired maximum driving speed or "gear" ratio may be obtained by simply changing the throw of the cranks or eccentrics, which will be equally strong and effective, however small the throw demanded for high reduction may be, in contradistinction to the corresponding pinion of a gear train, which must have a minimum of several teeth of substantial pitch, whence the bulk and weight of the conventional gear increases with higher gear ratios, which are obtained by the mechanism of this invention without increase in the size, weight or cost.

Under overload sufficient to entirely overcome the springs, the crank shaft may rotate indefinitely without moving the driven drum or losing energy except that due to friction, and thus the mechanism of this invention may with impunity be positively connected with a drive means beyond the capacity of the mechanism, without causing greater load on the parts than results from normal operation, and without the immediate loss of all the stored energy which is characteristic of friction clutch load limiting means, under these conditions.

The natural elasticity of the parts themselves under driving load, will relieve the springs shown in the connecting rods of a portion of the deflections they would be subjected to under overloads with hypothetically rigid parts, and with the small crank throws apportionate to high drive ratios, the aggregate load-deflection characteristic of the driving elments may be proportioned to absorb the entire crank throw without overstraining the parts and such an equivalent for the physical elements herein pictured and referred to as "springs," is within the scope of this invention.

Although this invention aims in general to the elimination of all the steps usual in high reduction gear trains, yet in cases where the driving member speed may be considered excessive for the reciprocating parts, a gear train of suitable reduction may be interposed to reduce the speed of these parts, while the mechanism of this invention will still operate as described, and eliminate the lower steps of the gear reduction and the power loss characteristic of frictional load limiting means.

Variations may be resorted to within the scope of the invention, and portions of the improvements may be used without the others whilst not departing from the spirit of the invention.

Having thus described my invention, I claim:

1. In a power transmission, a means for deriving a rotative motion, comprising oscillating arms, a driven drum having annular tracks, projections on the arms having opposed arcuate contact surfaces sufficiently extended at diagonally opposed ends to slide freely between the tracks in one direction and sufficiently shortened at the other ends of the surfaces so as to grip the tracks against sliding in the other direction.

2. A driving mechanism comprising in combination, a driving shaft, a driven shaft concentric therewith, intermediate means having a one-way connection with the driven shaft and drivably connected for oscillation to the driving shaft and spring means co-acting with said intermediate means, to limit the load transmitted to the capacity of the spring means, and means cooperating with said intermediate means for positively preventing reversal of the direction of rotation of the driving shaft.

3. A driving mechanism comprising, in combination, a driving shaft, a driven shaft concentric therewith, intermediate means for driving said driven shaft in one direction in response to rotation of said driving shaft, an eccentric member drivably connected to the driving shaft, an oscillatory member connecting said eccentric member with said intermediate means, and means cooperating with said intermediate means to vary the speed ratio between said driving and driven shafts automatically during one or more revolutions and in proportion to the load placed upon said driven shaft.

4. In a transmission mechanism, the combination of a driving member having an eccentric of fixed throw, a driven member concentric with the driving member, connecting means therebetween adapted to transfer an oscillating motion from the eccentric into a rotational motion of the driven member, a resilient means co-acting with said connecting means and adapted to yield so as to permit a plurality of turns of the driving member relative to the driven member.

5. In apparatus of the class described, the combination of a flywheel rotatable to high speed, an eccentric driven from the flywheel, a driven drum concentric with the flywheel, and means for driving said drum from the eccentric comprising levers having a one-way friction driving connection with the drum and resilient connections for normally oscillating the levers from the eccentric.

6. In apparatus of the class described, the combination of a shaft having an eccentrically formed driving means, a driven member concentric with said shaft, drive means adapted for oscillation from said driving means; a one-way driving connection between said drive means and driven member, stationary spring means in said drive means adapted to absorb the oscillation movement when an overload is encountered, and means cooperating with said drive means for positively preventing reversal of the direction of rotation of the driving means.

7. In a transmission mechanism, the combination of, a driving crank means, an oscillating means driven from the crank, a driven drum co-axial with the driving means and having an annular groove, arcuate projections associated with the oscillating means adapted to engage said annular groove and automatically to drivably and frictionally grip the drum only during the forward movement of each oscillation, and resilient means co-acting with said oscillating means and adapted under normal load to transmit a full oscillation and to yield to reduce to the amplitude of oscillation as the load increases from normal.

8. In apparatus of the class described, the combination of a driving crank shaft of fixed throw, means engaging the crank shaft for oscillation therefrom, stationary spring means co-acting with said means and adapted under normal loads to transmit a full oscillation and to yield to reduce the amplitude of oscillation transmitted as the load exceeds normal, a driven drum concentric with said driving crankshaft and having an annular groove, said oscillating means having arcuate projections engaging said annular groove and adapted to transmit only the forward motion of each oscillation to the drum by frictional engagement therewith.

9. A transmission mechanism comprising in combination, a drive shaft, an eccentric thereon, a driven drum having plurality of grooves concentric with the drive shaft, radial levers engaging the eccentric for oscillation therefrom, fulcrum springs for the levers, arms having arcuate projections at one end fitted to drivably engage the grooves during forward oscillation and to be slidably guided thereby during backward oscillation; the other end of said arms being articulated to said levers.

10. In apparatus of the class described, the combination of a drive shaft, an eccentric thereon, a driven drum having grooves concentric with the drive shaft, arcuate driving projections engaging the grooves for forward rotation therewith and backward oscillation therein, arms extending from said arcuate driving projections, radial levers articulated to the extended ends of said arms and engaging said eccentrics for oscillation therefrom, and spring fulcrum means for said radial levers.

11. In apparatus of the class described, a driven drum having grooves, arcuate projections engaged for movement in and with said grooves and supported therein, arms extending from said projections to the opposite side of the drum thereto, radial levers articulated to the arm extensions, a drive shaft rotationally engaged in the drum, an eccentric on the drive shaft engaging said radial levers for oscillation thereof, and spring fulcrum means for radial levers.

12. In a transmission mechanism, the combination of, a rotational driving member having an eccentric, a rotatable driven member disposed concentric with the driving member and provided with a plurality of annular drive faces, a plurality of similar elements each having portions adapted for engagement with the drive faces when actuated in a driving direction, actuating means for each of said elements comprising levers engaging said eccentric, and resilient fulcra for said levers substantially unyieldable under a normal load whilst deflectable by an overload.

13. A driving mechanism comprising in combination, a driving shaft having a crank, a plurality of yielding fulcrum means disposed about said shaft, radial levers engaging said crank and said fulcra, a driven drum, and means having a one-way driving connection with said drum and driven by said radial levers.

14. In apparatus of the class described, the combination of a drum to be driven, a driving crank, fulcrum means adapted to yield so as to absorb the movement due to said crank when loaded beyond a predetermined amount, a plurality of radially disposed operating levers supported on said fulcra and adapted for oscillating motion by means of said driving crank, and a plurality of members having a one-way driving connection with the drum and deriving a circumferential reciprocating motion from the oscillation of said operating levers; the extent of said motions being subject to the resistance offered by said fulcra.

15. In apparatus of the class described, the combination of a drum to be driven, a plurality of one-way driving connections thereon each having an arm extending over substantially one-half of the drum circumference, a driving crank, and yieldable driving levers connected to the extended arms and to the cranks for oscillation therefrom.

16. In a transmission, a driven member, spring connected one-way driving members engaging said driven member, and means for releasing the driving engagement between said members upon overload comprising a stop adapted to contact with the driving members to disengage the same from the driven member upon an abnormal deflection of the spring connection.

17. A means for converting an oscillating motion into a rotational motion comprising, a one-way drive lever, a driven member having opposed annular driving surfaces, a driving head on said lever having opposed arcuate faces circumferentially offset so as to bind between said driving surfaces when tilted by a forward effort at the extended end of the lever and to afford a relatively wide base of support against tilting and binding to support the lever for free sliding of the head relative to the driven member when the lever is actuated in a reversed direction.

18. A means for converting an oscillating motion into a rotational motion comprising, a driven member having annular inner and outer surfaces, a lever having an end provided with opposed arcuate faces contactable with said surfaces and circumferentially offset so that separation of the areas of contact with the inner and outer surfaces is relatively small when the lever is tilted in one direction and relatively great when the lever tends to tilt in the other direction so as to bind the contacting faces in the first case and to slidably support the lever in the second case.

19. Means for converting an oscillating motion into a rotary motion comprising in combination, a driven member having opposed annular driving surfaces, arcuately formed driving means engageable with each of said surfaces, a lever arm rigidly extended from said driving means; said arcuately formed driving means being circumferentially offset so as to afford a short base of support for the lever when driven in one direction and a long base of support when the lever is moved in the other direction to respectively grip and slidably support the lever.

20. In apparatus of the class described, the combination of a flywheel, means for rotating said flywheel and storing energy therein, a driven member normally rotatable at a fixed speed relation with respect to said flywheel but subject to variable loads, and means for transmitting the energy stored in said flywheel to said driven member comprising an eccentric driven by the flywheel, one-way driving means engaging said driven member and actuated by said eccentric, and resilient means cooperating with said one-way driving means for limiting to a predetermined amount the force transmitted thereby from the flywheel to the driven member when the latter is retarded by an overload.

Signed at Keyport, in the county of Monmouth, and State of New Jersey this 23rd day of April A. D. 1926.

ROLAND CHILTON.